US010932412B2

(12) United States Patent
Richard et al.

(10) Patent No.: US 10,932,412 B2
(45) Date of Patent: Mar. 2, 2021

(54) SUGARCANE HARVESTER CROP DIVIDER LIVE TOE WITH FIXED SHOE

(71) Applicant: DEERE & COMPANY, Moline, IL (US)

(72) Inventors: Eric P. Richard, Thibodaux, LA (US); Dusk S. Mixon, Thibodaux, LA (US); Neville H. Toft, Bettendorf, IA (US); Mark A. Matherne, Thibodaux, LA (US); Rafael Braga De Freitas Soares Lopes, Catalão (BR)

(73) Assignee: DEERE & COMPANY, Moline, IL (US)

( * ) Notice: Subject to any disclaimer, the term of this patent is extended or adjusted under 35 U.S.C. 154(b) by 202 days.

(21) Appl. No.: 16/169,257

(22) Filed: Oct. 24, 2018

(65) Prior Publication Data
US 2020/0128742 A1 Apr. 30, 2020

(51) Int. Cl.
*A01D 45/10* (2006.01)
*A01D 63/02* (2006.01)
*A01D 69/03* (2006.01)

(52) U.S. Cl.
CPC .............. *A01D 45/10* (2013.01); *A01D 63/02* (2013.01); *A01D 69/03* (2013.01)

(58) Field of Classification Search
CPC ........ A01D 45/10; A01D 63/02; A01D 69/03; A01D 57/01
See application file for complete search history.

(56) References Cited

U.S. PATENT DOCUMENTS

| 3,785,130 A | * | 1/1974 | Gaeddert | A01D 45/021 56/98 |
| 3,848,399 A | * | 11/1974 | Makeham | A01D 45/10 56/13.9 |
| 3,925,969 A | * | 12/1975 | Shunichi | A01D 45/10 56/13.9 |
| 3,995,412 A | * | 12/1976 | Gaeddert | A01D 45/021 56/98 |
| 4,154,047 A | * | 5/1979 | Quick | A01D 45/10 56/13.9 |
| 4,470,244 A | * | 9/1984 | Leigers | A01D 63/02 56/13.9 |
| 6,076,340 A | * | 6/2000 | Fowler | A01D 45/10 56/13.3 |

(Continued)

FOREIGN PATENT DOCUMENTS

| JP | 2003265014 A | * | 9/2003 | ............. A01D 45/10 |
| JP | 2008005715 A | * | 1/2008 | ............. A01D 45/10 |

(Continued)

OTHER PUBLICATIONS

YouTube video entitled "SRA CaneClip: EHS fronts"; last accessed from https://www.youtube.com/watch?v=JAdzeqaJ4hk on Jan. 25, 2019; 1 page screenshot provided.

*Primary Examiner* — Arpad Fabian-Kovacs
(74) *Attorney, Agent, or Firm* — Taft Stettinius & Hollister LLP; Stephen F. Rost (57) ABSTRACT

A crop divider assembly for a sugarcane harvesting machine that has a first scroll having an upper end and a lower end, a first toe defined along a portion of the lower end of the first scroll, the first toe being a radially inward taper of the first scroll, and a shoe positioned adjacent to a portion of the first toe.

20 Claims, 5 Drawing Sheets

(56) References Cited

U.S. PATENT DOCUMENTS

| | | | | |
|---|---|---|---|---|
| 6,745,550 | B1* | 6/2004 | Hinds | A01D 45/10 |
| | | | | 56/13.3 |
| 8,387,998 | B2* | 3/2013 | Hinds | A01D 45/10 |
| | | | | 172/624.5 |
| 9,781,880 | B2* | 10/2017 | Cleodolphi | A01D 34/006 |
| 10,356,982 | B2* | 7/2019 | Bertino | A01D 63/02 |
| 2010/0307121 | A1* | 12/2010 | Marchini | A01D 75/28 |
| | | | | 56/63 |
| 2015/0359177 | A1* | 12/2015 | Richard | A01D 34/664 |
| | | | | 56/14.7 |
| 2016/0135365 | A1* | 5/2016 | Cleodolphi | A01D 34/006 |
| | | | | 56/10.2 E |
| 2017/0000026 | A1* | 1/2017 | Seki | A01D 45/10 |
| 2017/0112063 | A1* | 4/2017 | Craig | A01D 61/02 |
| 2018/0338423 | A1* | 11/2018 | Lucca | A01D 41/127 |
| 2018/0338426 | A1* | 11/2018 | Seki | A01D 67/00 |
| 2018/0352744 | A1* | 12/2018 | Lucca | A01D 45/10 |

FOREIGN PATENT DOCUMENTS

| | | | | |
|---|---|---|---|---|
| WO | WO-2014127005 | A1* | 8/2014 | A01D 45/10 |
| WO | WO-2018037543 | A1* | 3/2018 | A01D 45/10 |

\* cited by examiner

SUGARCANE HARVESTER CROP DIVIDER LIVE TOE WITH FIXED SHOE

FIELD OF THE DISCLOSURE

The present disclosure relates to a scroll assembly on a sugarcane harvesting machine, and in particular to a scroll assembly that reduces debris and crop interference with the scroll assembly.

BACKGROUND

Sugarcane harvesters often implement a series of scrolls to position the crop in an orientation to be harvested. The scrolls rotate and have fighting extending from an exterior surface wherein the flighting contacts and raises the crop as the scroll rotates. During a harvest operation, the sugarcane harvester travels in a forward direction aligned with the row or rows of sugarcane to be harvested. As the sugarcane harvester approaches the crop, the scrolls position the crop to be substantially upright and the sugarcane harvester cuts the crop from the ground to be further processed.

The leading edge of the scrolls or live toe are often positioned close to the underlying surface in order to contact and raise any fallen crop. In this configuration, the leading edge of the scrolls or live toe often becomes exposed to a substantial amount of debris as the scroll passes over the underlying surface. Debris positioned along the scrolls can damage bearings of the scrolls or cause the scrolls to bind or otherwise restrict rotation. When the scrolls are compromised in this way, the sugarcane harvester becomes inefficient both in fuel consumption and throughput. More specifically, when scroll bearings are damaged or the scroll is otherwise resisting rotation, the sugarcane harvester must consume additional resources to rotate the scrolls at the desired speed. Further, if the scrolls are inhibited from rotating at the proper speed, the scrolls of the sugarcane harvester may not be properly positioning the crop to be cut and harvested, thereby causing a loss in the potential yield.

Accordingly, there is a need for a scroll assembly that reduces the amount of debris that can be positioned to compromise the effectiveness of the scroll assembly.

SUMMARY

One embodiment is a crop divider assembly for a sugarcane harvesting machine that has a first scroll having an upper end and a lower end, a first toe defined along a portion of the lower end of the first scroll, the first toe being a radially inward taper of the first scroll, and a shoe positioned adjacent to a portion of the first toe.

One example of this embodiment has a frame member, wherein the first scroll and the first toe are rotationally coupled to the frame member and the shoe is removably coupled to the frame member.

Another example of this embodiment has a second scroll having an upper end and a lower end, and a second toe defined along a portion of the lower end of the second scroll, the second toe being a radially inward taper of the second scroll. Wherein, a scroll width is defined between the outer surface of the first and second scroll. Further wherein, the shoe defines a shoe width, the shoe width being less than the scroll width. In one aspect of this example, the shoe defines a contoured edge along the first toe and the second toe.

In yet another example of this embodiment the shoe comprises a center plate defined along a central portion of the shoe, the center plate configured to divert crop and debris to a first side or a second side of the shoe.

In another example the shoe has a breakaway toe coupled thereto, wherein the breakaway toe is positioned downward of the lower end of the first scroll relative to a horizontal plane when the sugarcane harvesting machine is on a level surface.

In another example of this embodiment, the shoe diverts crop towards the first toe during a harvest operation.

Another example has a second scroll having an upper end and a lower end and a second toe defined along a portion of the lower end of the second scroll, the second toe being a radially inward taper of the second scroll. Wherein, the shoe is positioned adjacent to a portion of the second toe. In one aspect of this example, the shoe diverts crop towards the first toe or the second toe during a harvest operation.

Another embodiment is a crop divider assembly for a multi-row sugarcane harvesting machine that has a frame member, a first scroll rotationally coupled to the frame member, a first toe coupled to the first scroll, a second scroll rotationally coupled to the frame member, a second toe coupled to the second scroll, and a shoe positioned adjacent to a portion of the first toe and the second toe.

In one example of this embodiment, the shoe is removably coupled to the frame member.

In another example, the shoe has a shoe width proximate to the first and second toe, the shoe width being less than a scroll width defined between an outer surface of the first and second scroll.

In yet another example, the shoe has a wedge-shaped profile.

In another example of this embodiment, the shoe has a center plate defined along a center portion of the shoe, the center plate configured to divert crop towards either a first side or a second side of the shoe.

In yet another example the shoe has a breakaway toe coupled thereto, wherein the breakaway toe is positioned downward of the first toe and the second toe relative to a horizontal plane during a harvest operation.

In another example the shoe diverts crop towards the first toe or the second toe during a harvest operation.

In another example of this embodiment the bottom portion of both the first scroll and the second scroll is rotationally coupled to the frame member adjacent one another relative to a longitudinal axis of the sugarcane harvesting machine.

Yet another embodiment is a method for assembling a crop divider for a sugarcane harvesting machine that includes providing a frame member, a first scroll, a first toe coupled to the first scroll, the first toe being a radially inward taper of the first scroll, and a shoe. Rotationally coupling the first scroll to the frame member and removably coupling the shoe to the frame member adjacent to a portion of the first toe.

In one example of this embodiment the removably coupling the shoe step includes positioning the shoe along the frame member to direct crop towards the first toe. One aspect of this example includes providing a second scroll and a second toe coupled to the second scroll, the second toe being a radially inward taper of the second scroll and rotationally coupling the second scroll to the frame member so a portion of the second toe is positioned adjacent to the shoe when the shoe is coupled to the frame member.

BRIEF DESCRIPTION OF THE DRAWINGS

The above-mentioned aspects of the present disclosure and the manner of obtaining them will become more apparent and the disclosure itself will be better understood by reference to the following description of the embodiments of the disclosure, taken in conjunction with the accompanying drawings, wherein.

Corresponding reference numerals indicate corresponding parts throughout the several views

DETAILED DESCRIPTION

The embodiments of the present disclosure described below are not intended to be exhaustive or to limit the disclosure to the precise forms in the following detailed description. Rather, the embodiments are chosen and described so that others skilled in the art may appreciate and understand the principles and practices of the present disclosure.

Figure 1:
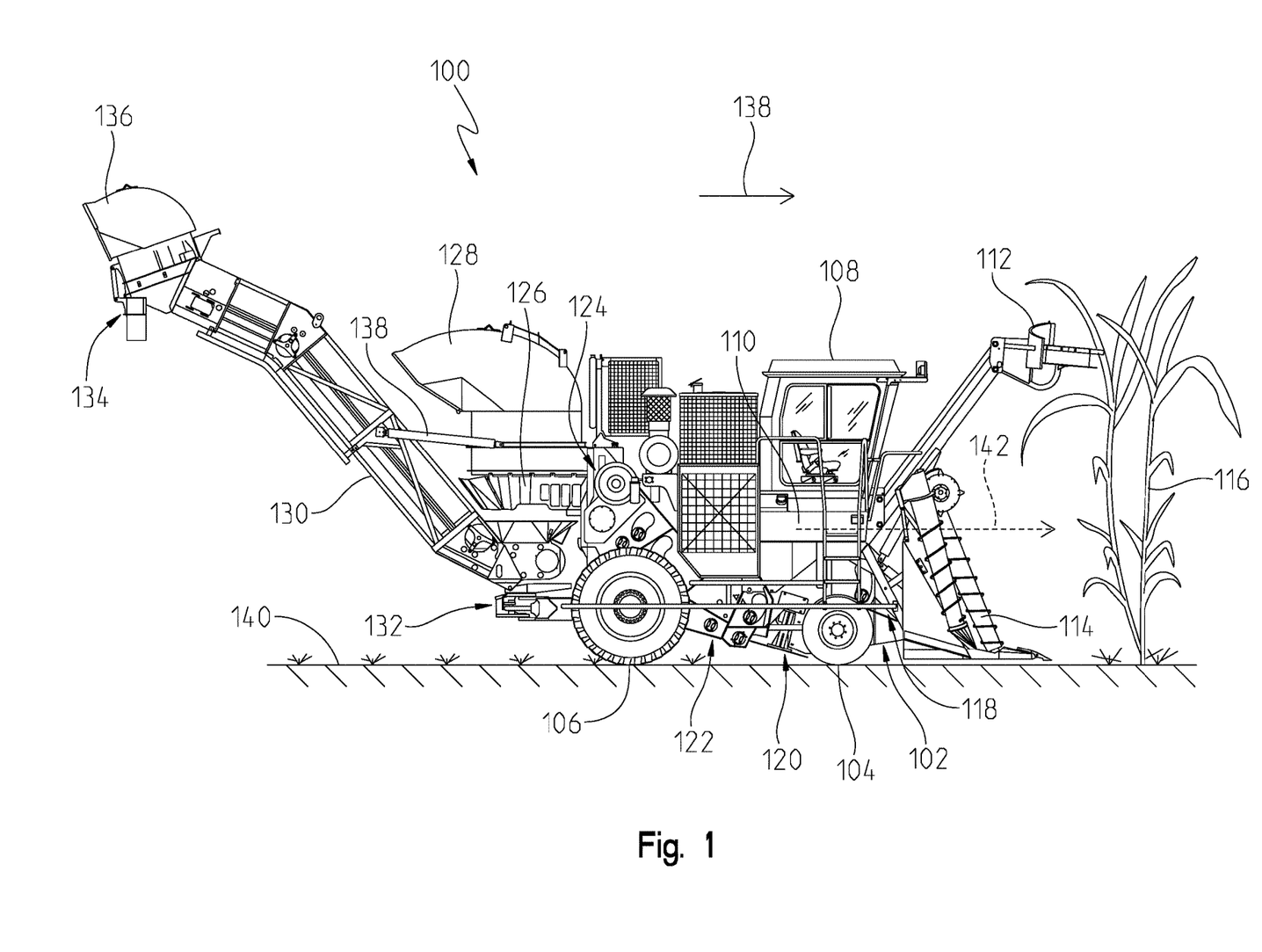
FIG. 1 is a side view of a sugarcane harvesting machine.

Turning now to FIG. 1 of this disclosure, an embodiment of a sugarcane harvesting machine 100 is shown. The harvester or machine 100 is presented in a side view in FIG. 1, with the front of the machine 100 facing to the right. Accordingly, certain left-side components of the machine 100 may not be visible in FIG. 1.

The machine 100 may include a main frame 102 supported on track assemblies (not shown) or wheels (i.e., a front wheel 104 and a rear wheel 106), with a cab 108 adapted to house an operator. The cab 108 may include a plurality of controls for controlling the operation of the machine 100. An engine 110 or other power system may supply power for driving the machine 100 along a field and for powering various driven components of the machine. In certain embodiments, the engine 110 may directly power a hydraulic pump (not shown), and various driven components of the harvester may be powered by hydraulic motors (not shown) receiving hydraulic power from the hydraulic pump via an embedded hydraulic system (not shown).

A cane topper 112 may extend forward of the frame 102 in order to remove the leafy tops of sugarcane plants 116, and a set of crop dividers 114 (only the right-side divider shown in FIG. 1) may then guide the remainder of the sugarcane toward internal mechanisms of the machine 100 for processing. As the sugarcane harvesting machine 100 moves across a field, plants 116 passing between the crop dividers 114 may be deflected downward by one or more knockdown rollers 118 before being cut near the base of the plants by a base cutter assembly 120 mounted on the main frame 102. Rotating disks, guides, or paddles (not shown) on the base cutter assembly 120 may further direct the cut ends of the plants upwardly and rearward within the harvester 100 toward a feeding mechanism such as successive pairs of upper and lower feed rollers (not shown). The feeding mechanism may be rotatably supported by a chassis 122, and may be rotatably driven by a hydraulic motor or other device (not shown) in order to convey the stalks toward a chopper drum module 124 for chopping into relatively uniform billets.

The chopper drum module 124 may include upper and lower chopper drums which may rotate in opposite directions around, respectively, parallel axes (not shown) in order to chop the passing stalks into billets and propel the billets into a cleaning chamber 126 at the base of a first or primary extractor 128. The first extractor 128 may utilize a powered fan to extract trash and debris from the cleaning chamber 126.

As also shown in FIG. 1, a loading conveyor or elevator system 130 may be provided at a rear portion of the harvester. The loading conveyor or elevator system 130 may include a forward end located at the bottom of the cleaning chamber 126, and the system may then convey the cleaned billets upward to a discharge location 134 near or below a second extractor 136. The billets may be discharged via the second extractor 136 into a trailing truck, cart, wagon or other receptacle (not shown).

The elevator or conveyor system 130 may be coupled to a swing table or pivot bearing 132, as shown in FIG. 1. As such, the entire system 130 is capable of pivoting up to or about 180° to unload the billets from either side of the machine 100.

Figure 2:
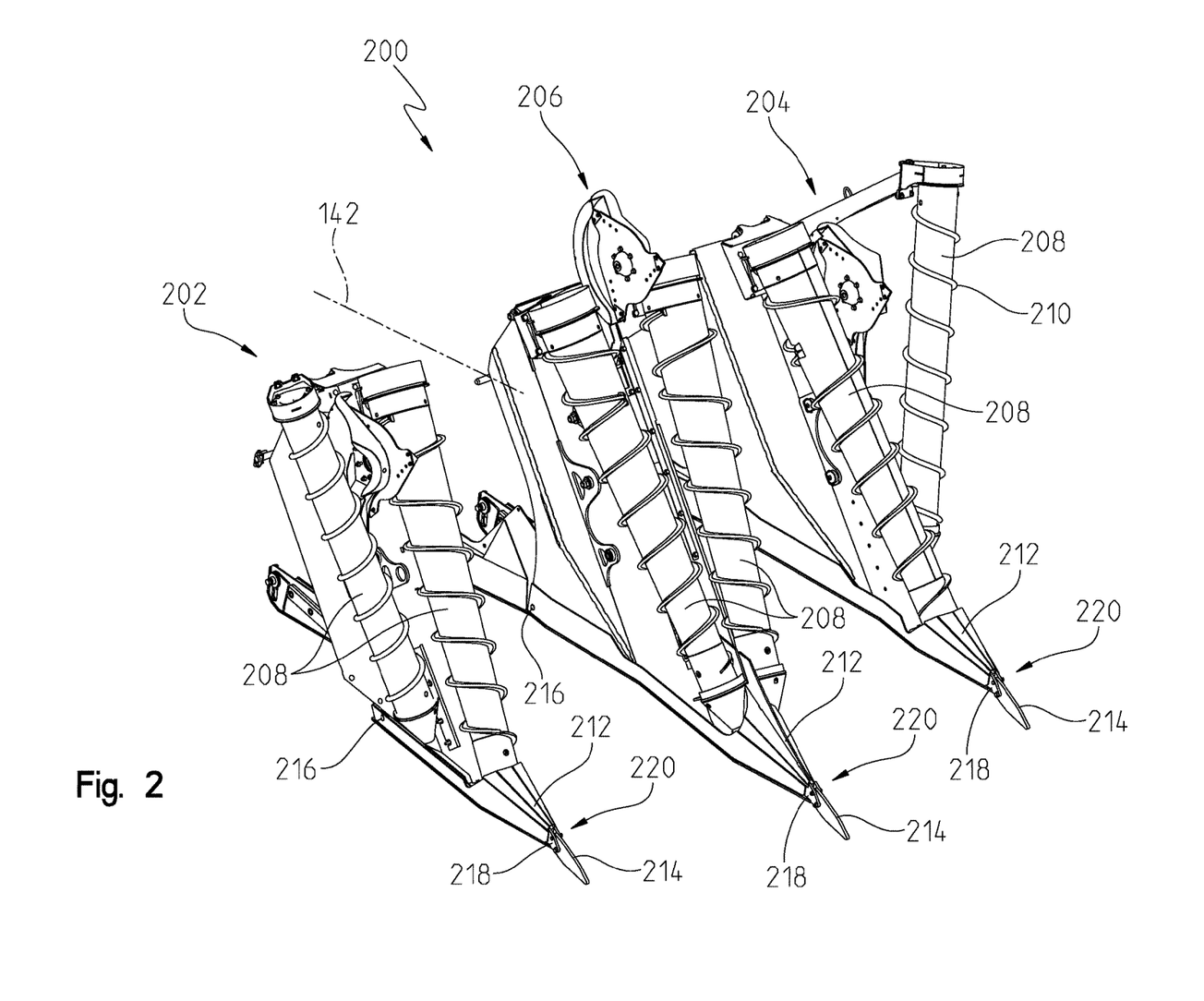
FIG. 2 is an elevated perspective view of multiple crop divider assemblies isolated from the harvesting machine.

Referring now to FIG. 2, multiple crop divider assemblies 200 are illustrated removed from the remainder of the sugarcane harvesting machine 100. In the non-exclusive example of FIG. 2, the multiple divider assemblies 200 may be configured to harvest two rows of sugarcane simultaneously. More specifically, the multiple crop divider assembly 200 may have a first side crop divider assembly 202, a second side crop divider assembly 204, and a center crop divider assembly 206. The crop divider assemblies 200 may be spaced from one another to direct sugarcane to the knockdown roller 118 to be further cut and processed by the sugarcane harvesting machine 100.

Each of the crop divider assemblies 200 may have one or more scroll 208 rotationally coupled thereto. The scroll 208 may be rotationally coupled the corresponding crop divider assembly 202, 204, 206 with one or more bracket and bearing. Further, a motor or the like may be coupled to the crop divider assembly on one end, and be coupled to the corresponding scroll 208 on the other. In this configuration, the motor may rotationally drive the scroll 208 to rotate relative to the remaining components of the crop divider assembly 202, 204, 206. Further, each scroll 210 may have flighting 210 extending radially away therefrom. The flighting 210 may contact plants 116 as the scroll 210 rotates during a harvest operation and direct the plants 116 towards an upright position to be harvested as described herein.

In one aspect of this disclosure, each of the multiple crop divider assemblies 200 may have a shoe 212 removably coupled thereto. The shoes 212 may be positioned along a leading portion 220 of the corresponding crop divider assembly 202, 204, 206 and be shaped to direct plants 116 laying on or near an underlying surface 140 towards the adjacent scrolls 208. Further, each shoe 212 may have a breakaway toe 214 removably coupled thereto. The breakaway toe 214 may extend from the leading portion 220 of the shoe 212 at least partially downwardly towards the underlying surface 140.

In this orientation, the breakaway toe 214 may be positioned adjacent to, or partially within the underlying surface 140 during a harvesting operation. Accordingly, the breakaway toe 214 may contact fallen plants 116 during the harvest operation and urge the fallen plants 116 towards the adjacent shoe 212. The shoe 212 may continue to lift the plant 116 as the sugarcane harvester moves in a harvest direction 138 that substantially corresponds with a longitudinal axis 142 of the sugarcane harvester 100. The shoe 212 may direct the plant 116 to contact the adjacent scroll 208 wherein the flighting 210 of the rotating scroll 208 further urges the plant 116 to the upright position where the plant can be harvested.

Figure 3:
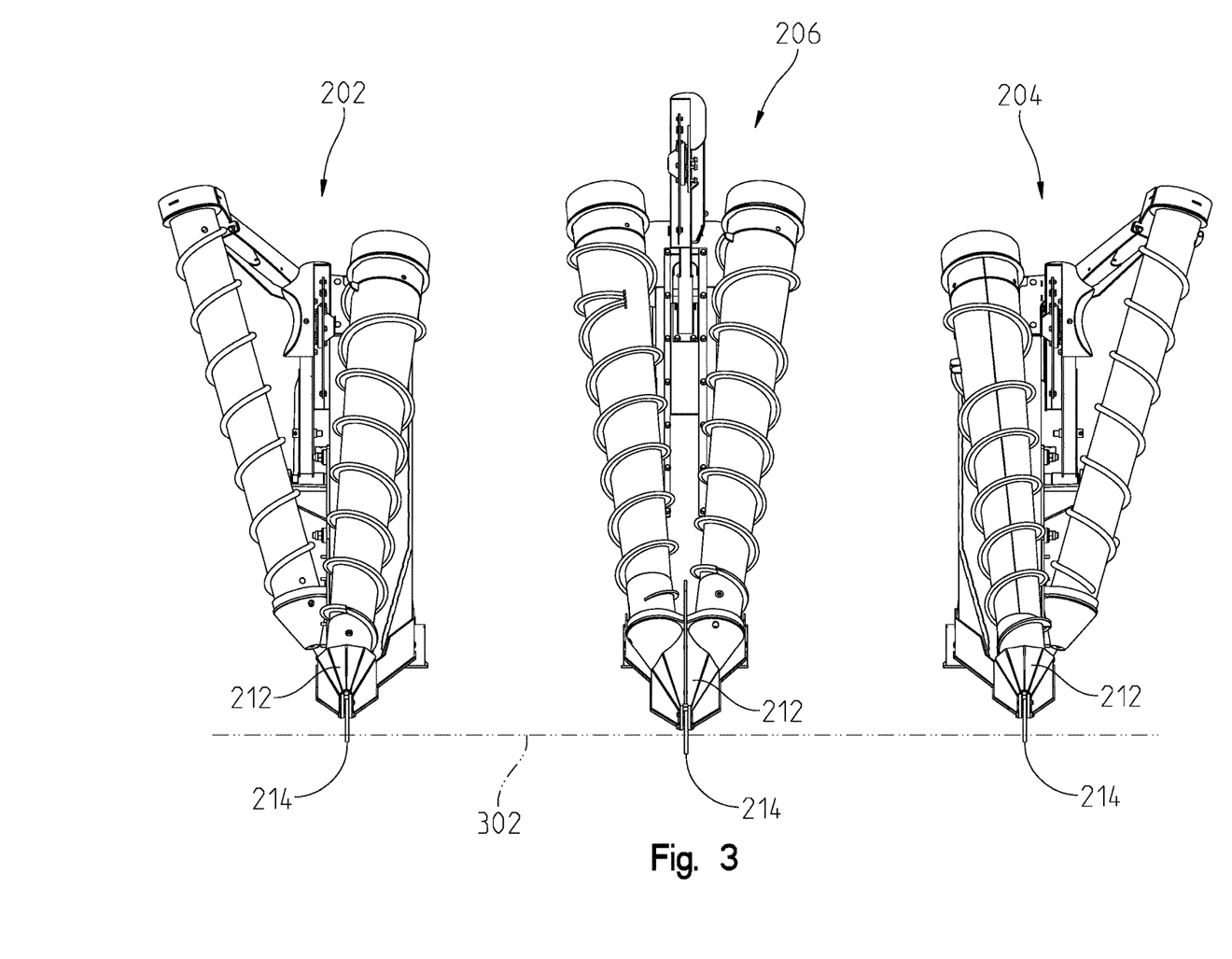
FIG. 3 is a front view of the multiple crop divider assemblies from FIG. 2.

Referring now to FIG. 3, the positioning of the breakaway toe 214 is more clearly illustrated. More specifically, the breakaway toe 214 is illustrated extending below a horizontal plane 302. As described above, the breakaway toe 214 may extend downward towards the underlying surface 140. In the non-exclusive example of FIG. 3, the horizontal plane 302 may represent the underlying surface 140 wherein the breakaway toe 214 at least partially penetrates the underlying surface 140 to ensure any plants lying thereon are properly repositioned.

In one aspect of this disclosure, both the shoe 212 and the breakaway toe 214 may be removeably coupled to the corresponding crop divider assembly 202, 204, 206. Both the shoes 212 and the breakaway toes 214 are exposed to substantial wear during a harvest operation. Accordingly, both of these components 212, 214 are designed to be easily replaceable. More specifically, the shoe 212 may be positioned at least partially over the leading edge of the crop divider assembly 202, 204, 206 and the trailing edge of the shoe 212 may be removeably coupled to the corresponding crop divider assembly 202, 204, 206 via one or more fastener 216. The entire shoe 212 can be removed and replaced by uncoupling the fastener 216.

Similarly, each breakaway toe 214 may be removably coupled to the corresponding shoe 212 via one or more fastener 218. Further, the fastener 218 may be specifically designed to only withstand a minimal sheer stress wherein the breakaway toe 214 may become uncoupled from the shoe 212 during a hard contact. In one non-exclusive example, the breakaway toe 214 may contact a rock or the like during the harvest operation. The contact with the rock may cause a sheer stress to act on the fastener 218 that may totally sheer the fastener 218 and allow the breakaway toe 214 to move out of the path of the rock. In short, the breakaway toe 214 may be configured to break away from the shoe 212 during a hard contact.

Figure 4:
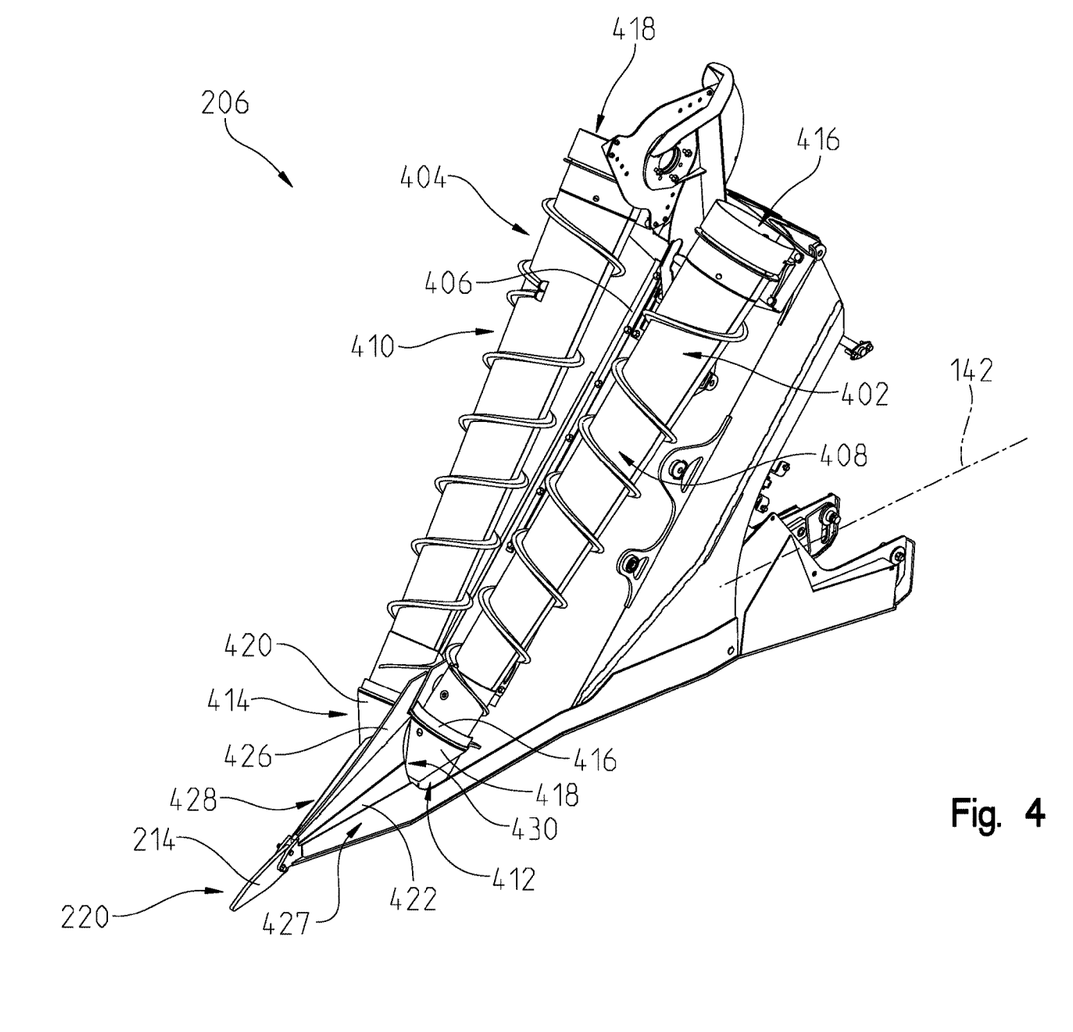
FIG. 4 is an elevated perspective view of a center crop divider assembly from the multiple crop divider assemblies of FIG. 2.

Referring now to FIG. 4, the center crop divider assembly 206 is illustrated. The center crop assembly 206 may have a first scroll 402 and a second scroll 404 rotationally coupled to a frame member 406. Each of the first and second scroll 402, 404 may have an upper end 408, 410 and a lower end 412, 414. Each upper end 408, 410 may be coupled to a respective motor 416, 418 to thereby rotationally drive the corresponding scroll 402, 404. Further, the lower ends 412, 414 may be rotationally coupled to the frame member 406 via one or more bearing bracket 416. Further still, a first and second toe 418, 420 may be coupled to the corresponding scroll 402, 404 to rotate therewith.

A center shoe 422 may be positioned along the leading end 424 of the center crop divider assembly 206. The center shoe 422 may have a center plate 426 positioned along a substantially central portion of the center shoe 422. The center plate 426 may extend away from the outer surface of the center shoe 422 along a substantially vertical plane when coupled to the sugarcane harvester 100 and positioned on a level surface. In one aspect of this disclosure, the center plate 426 and breakaway toe 214 may be substantially coplanar. In this orientation, when the leading portion of the breakaway toe 214 contacts a plant 216, it will direct the plant 216 to either a first side 427 or a second side 428. As the sugarcane harvester 100 continues to travel in the harvest direction 138, the center plate 426 will continue to direct the plant 116 to the same first or second side 427, 428 as the breakaway toe 214 until the crop 116 contacts the corresponding first or second toe 418, 420. At this point, the rotation of the toe 418, 420 and the scroll, 402, 404 will continue to raise the plant 116 as the sugarcane harvester 100 travels in the harvest direction 138.

In one aspect of this disclosure, the shoe 422 may define a shoe cavity 430 therein. The shoe cavity 430 may be a cavity defined by the walls of the shoe 422. In other words, the shoe 422 may be a substantially wedge-shaped shell surrounding the shoe cavity 430. In one aspect of this disclosure, portions of the frame member 406 may be positioned within the shoe cavity 430. In yet another aspect of this disclosure both the first and second toe 418, 420 may be positioned adjacent to the shoe cavity 430 to ensure crop is directed from the outer surface of the shoe 422 to the outer surface of the corresponding toe 418, 420. In other words, the shoe cavity 430 allows portions of the first and second toe 418, 420 to be positioned adjacent to or partially within the shoe cavity 430 to direct plants 116 along the corresponding scrolls 402, 404 as the sugarcane harvester 100 travels in the harvest direction 138.

Figure 5:
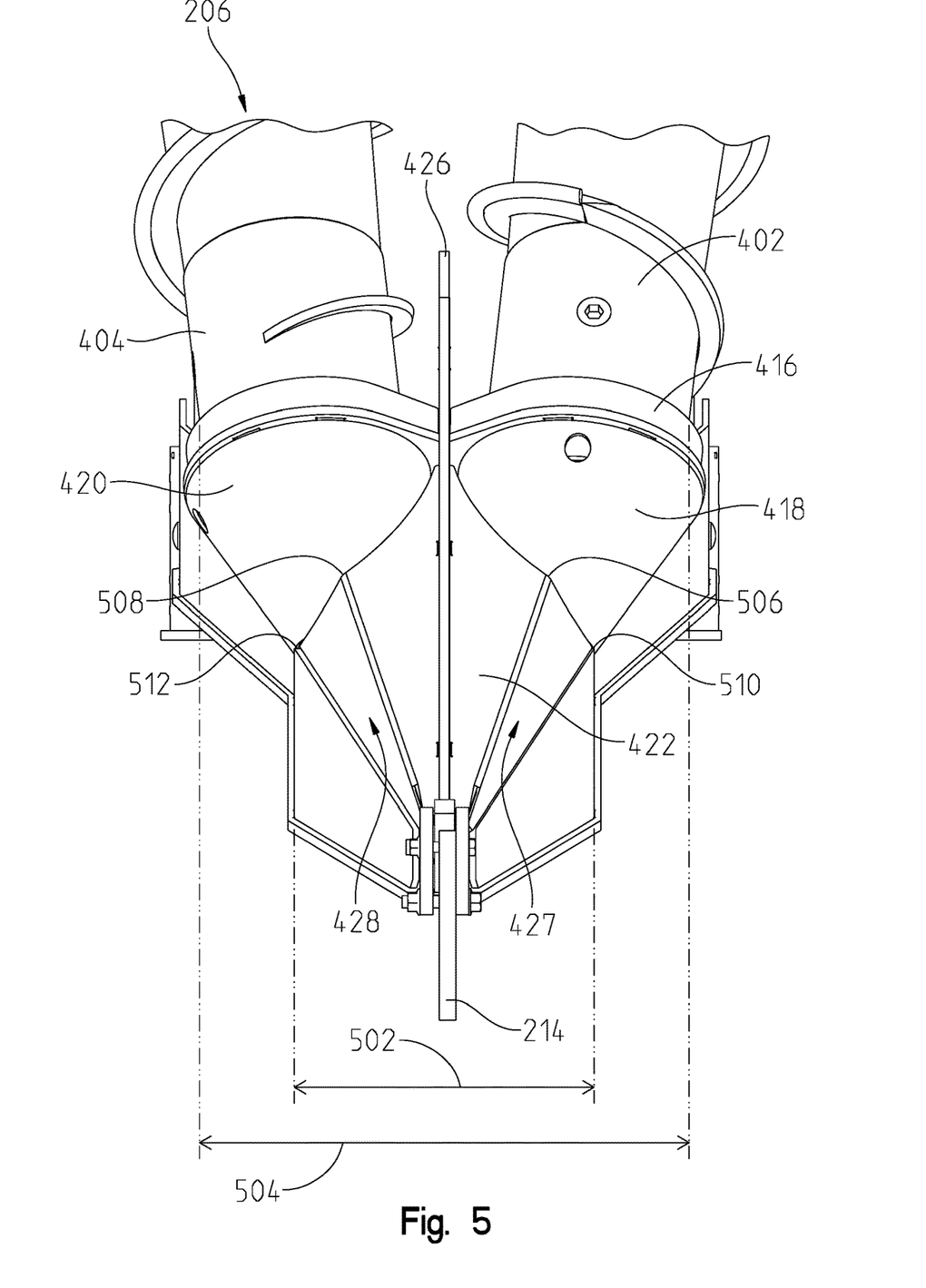
FIG. 5 is a front detailed view of a shoe of the center crop divider assembly of FIG. 4.

Referring now to FIG. 5 a shoe width 502 is illustrated. The shoe width 502 may be the horizontal width of the shoe 422 as viewed from the front view of FIG. 5. The shoe width 502 may be determined at the sides of the shoe 422 proximate to the first and second toes 418, 420. In other words, the shoe width 502 may be the horizontally outermost portions of the shoe 422 where the shoe 422 terminates and the toes 418, 420 begin.

Similarly, a scroll width 504 may be defined as the distance between the horizontally outermost portion of the first and second scrolls 402, 204 at the bearing bracket 416 from the front perspective of FIG. 5. As illustrated in FIG. 5, the shoe width 502 may be less than the scroll width 504. In one aspect of this disclosure, having a shoe width 502 that is less than the scroll width 504 minimizes the amount of debris collected by the shoe 422 during a harvest operation. More specifically, the shoe 422 is often the first portion of the sugarcane harvester 100 to contact plants 116 and other debris during a harvest operation. By minimizing the horizontal width of the shoe 422, the amount of debris that contacts the shoe 422 may be reduced.

Also illustrated in FIG. 5 is a first and second contoured edge 506, 508 of the shoe 422. The first contoured edge 506 may be the edge of the shoe 422 that is closest to the first toe 418. The first contoured edge 506 may be one or more arc-shaped contour that substantially follows the shape of the first toe 418 as the first contoured edge 506 extends from a first side 510 to the center plate 426. Similarly, the second contoured edge 508 may be the edge of the shoe 422 that is closest to the second toe 420. The second contoured edge 508 may be one or more arc-shaped contour that substantially follows the shape of the second toe 420 as the second contoured edge 508 extends from a second side 512 to the center plate 426. In one aspect of this disclosure, the first and second contoured edges 506, 508 may extend from their corresponding sides 510, 512 to a location adjacent to, or in contact with, the bearing bracket 416.

In one aspect of this disclosure, the shoe 422 may substantially block plants 116 or other debris from becoming positioned in the space between the first and second toes 418, 420 and the leading portion of the shoe 422. More specifically, the shoe 422 may be wedge-shaped as it extends from the breakaway toe 214 to the contoured edges 506, 508. In this configuration, the shoe 422 substantially blocks plants 116 and other debris from becoming positioned between the toes 418, 420 during a harvesting operation by diverting the plants 116 or debris to either the first side 427 or the second side 428 while traveling in the harvest direction 138. Accordingly, the relationship of the shoe 422 with the toes 418, 420 provides a smooth path for plants 116 and other debris to be diverted away from the space between the first and second scrolls 402, 404 and towards either the first or second side 427, 428.

While one embodiment shown and described herein has two scrolls 402, 404 positioned substantially adjacent to one another behind the toe 422, the teachings of this disclosure may also be applied to a single scroll and toe. More specifically, the single scroll may have a single toe that is positioned behind the shoe as described herein. In the single scroll embodiment, however, the single toe may be positioned along a substantially central portion of the corresponding shoe instead of being offset to a first or second side as illustrated herein. Accordingly, while this disclosure illustrates and describes a shoe 422 that corresponds with two toes 418, 420, the teachings described herein are equally applicable to a single scroll and toe application as well.

While embodiments incorporating the principles of the present disclosure have been described hereinabove, the present disclosure is not limited to the described embodiments. Instead, this application is intended to cover any variations, uses, or adaptations of the disclosure using its general principles. Further, this application is intended to cover such departures from the present disclosure as come within known or customary practice in the art to which this disclosure pertains and which fall within the limits of the appended claims.

The invention claimed is:

1. A crop divider assembly for a sugarcane harvesting machine, comprising:
   a first scroll having an upper end and a lower end;
   a first toe defined along a portion of the lower end of the first scroll and configured to rotate with the first scroll, the first toe being a radially inward taper relative to an outer surface of the first scroll; and
   a shoe positioned adjacent to a portion of the first toe.

2. The crop divider assembly of claim 1, further comprising a frame member, wherein the first scroll and the first toe are rotationally coupled to the frame member and the shoe is removably coupled to the frame member.

3. The crop divider of claim 1, further comprising:
   a second scroll having an upper end and a lower end; and
   a second toe defined along a portion of the lower end of the second scroll and configured to rotate with the second scroll, the second toe being a radially inward taper relative to an outer surface of the second scroll;
   wherein, a scroll width is defined between the outer surface of the first and second scroll;
   further wherein, the shoe defines a shoe width, the shoe width being less than the scroll width.

4. The crop divider of claim 3, further wherein the shoe defines a contoured edge along the first toe and the second toe.

5. The crop divider assembly of claim 1, further wherein the shoe comprises a center plate defined along a central portion of the shoe, the center plate configured to divert crop and debris to a first side or a second side of the shoe.

6. The crop divider assembly of claim 1, further wherein the shoe has a breakaway toe coupled thereto, wherein the breakaway toe is positioned downward of the lower end of the first scroll relative to a horizontal plane when the sugarcane harvesting machine is on a level surface.

7. The crop divider assembly of claim 1, further wherein the shoe diverts crop towards the first toe during a harvest operation.

8. The crop divider assembly of claim 1, further comprising:
   a second scroll having an upper end and a lower end; and
   a second toe defined along a portion of the lower end of the second scroll an configured to rotate with the second scroll, the second toe being a radially inward taper relative to an outer surface of the second scroll;
   wherein, the shoe is positioned adjacent to a portion of the second toe.

9. The crop divider of claim 8, further wherein the shoe diverts crop towards the first toe or the second toe during a harvest operation.

10. A crop divider assembly for a multi-row sugarcane harvesting machine, comprising:
    a frame member;
    a first scroll rotationally coupled to the frame member;
    a first toe coupled to the first scroll and configured to rotate with the first scroll;
    a second scroll rotationally coupled to the frame member;
    a second toe coupled to the second scroll and configured to rotate with the second scroll; and
    a shoe positioned adjacent to a portion of the first toe and the second toe.

11. The crop divider assembly of claim 10, further wherein the shoe is removably coupled to the frame member.

12. The crop divider of claim 10, further wherein the shoe has a shoe width proximate to the first and second toe, the shoe width being less than a scroll width defined between an outer surface of the first and second scroll.

13. The crop divider of claim 10, further wherein the shoe has a wedge-shaped profile.

14. The crop divider assembly of claim 10, further wherein the shoe comprises a center plate defined along a center portion of the shoe, the center plate configured to divert crop towards either a first side or a second side of the shoe.

15. The crop divider assembly of claim 10, further wherein the shoe has a breakaway toe coupled thereto, wherein the breakaway toe is positioned downward of the first toe and the second toe relative to a horizontal plane during a harvest operation.

16. The crop divider assembly of claim 10, further wherein the shoe diverts crop towards the first toe or the second toe during a harvest operation.

17. The crop divider assembly of claim 10, further wherein the bottom portion of both the first scroll and the second scroll is rotationally coupled to the frame member adjacent one another relative to a longitudinal axis of the sugarcane harvesting machine.

18. A method for assembling a crop divider for a sugarcane harvesting machine, comprising:
    providing a frame member, a first scroll, a first toe coupled to the first scroll, the first toe being a radially inward taper relative to an outer surface of the first scroll, and a shoe defining a shoe cavity therein;
    rotationally coupling the first scroll to the frame member; and
    removably coupling the shoe to the frame member adjacent to a portion of the first toe so at least a portion of the first toe is positioned within the shoe cavity.

19. The method of assembling a crop divider of claim 18, further wherein the removably coupling the shoe step includes positioning the shoe along the frame member to direct crop towards the first toe.

20. The method of assembling a crop divider of claim 19, further comprising:

providing a second scroll and a second toe coupled to the second scroll, the second toe being a radially inward taper relative to an outer surface of the second scroll; and rotationally coupling the second scroll to the frame member so a portion of the second toe is positioned adjacent to the shoe when the shoe is coupled to the frame member.

* * * * *